April 30, 1968 L. JABLANSKY 3,380,382
GUN LAUNCHED LIQUID ROCKET
Filed July 20, 1966
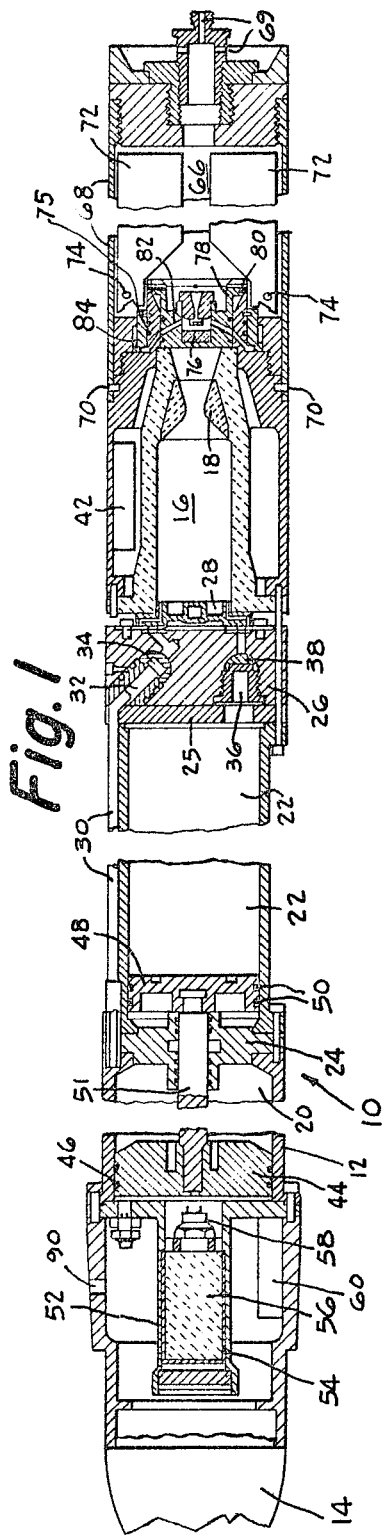
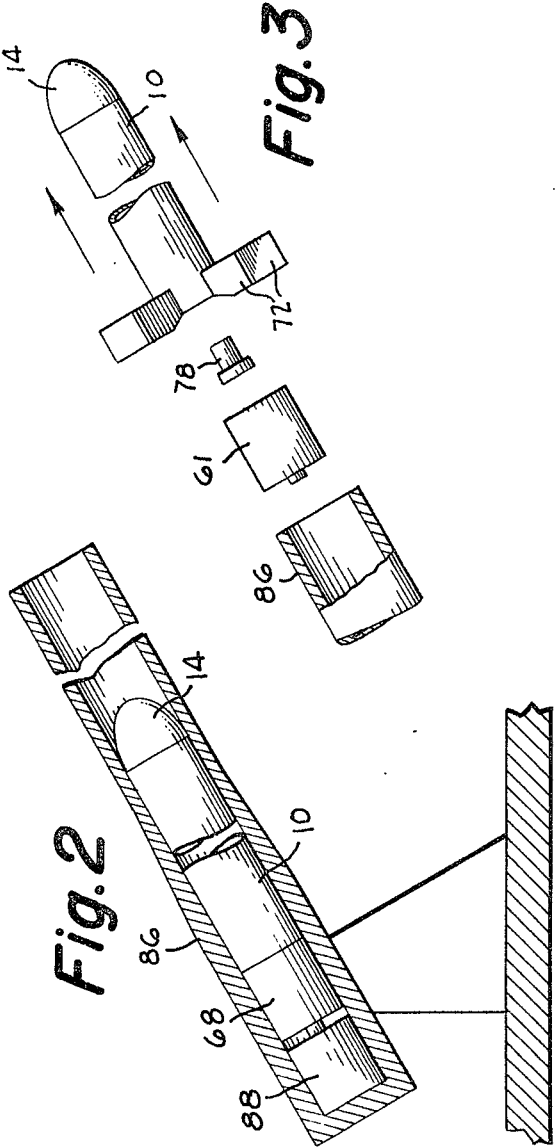
INVENTOR
LOUIS JABLANSKY
BY: Harry M. Saragovitz,
Edward J. Kelly, Hubert Berl &
S. Pubroff ATTORNEYS

United States Patent Office 3,380,382
Patented Apr. 30, 1968

3,380,382
GUN LAUNCHED LIQUID ROCKET
Louis Jablansky, Fair Lawn, N.J., assignor to the United States of America as represented by the Secretary of the Army
Filed July 20, 1966, Ser. No. 566,696
4 Claims. (Cl. 102—49.8)

ABSTRACT OF THE DISCLOSURE

A rocket including a payload section, a combustion chamber and a hypergolic liquid fuel system. The fuel system including a tank containing an oxidizer, a tank containing a fuel, an injector interconnecting the tanks with the combustion chamber, and pressure responsive means actuated by a propellant charge and associated with the tanks for controlling the flow of oxidizer and fuel from the tanks into the combustion chamber.

---

This invention relates to a rocket and particularly to a gun launched liquid propellant rocket.

It has not been common to launch a liquid propellant rocket from a gun barrel. Rather conventional means such as rack or rail launching have been resorted to, or solid propellant rockets used. Both of these old methods of rocket launching have necessarily features which are inherently disadvantageous. As an example, a rack launched liquid propellant rocket could require two stages of propulsion, namely a boost stage and a sustain stage. The boost stage system is either jettisoned or carried along with the rocket. Heavy design penalties are imposed for jettisoning while the range of the rocket is limited if the boost stage is to be carried along. A gun launched system with a liquid propellant rocket avoids these disadvantages by completely eliminating an integral boost stage and substitutes therefore a separate launching charge. Moreover, this permits the use of the liquid propellant rocket in unaltered basic artillery weapon systems. Furthermore, in gun launching, liquid propellant is more efficient than solid propellant. Liquid propellant permits accurate range zoning of the rocket by simply terminating the thrust by closing a valve in the propellant feed line. On the other hand, solid propellant rocket range zoning necessitates complicated controls as those skilled in the art can readily attest to. Liquid propellants are not adversely affected structurally by the high setback forces resulting from the large accelarations in guns. Solid propellants are, however, adversely affected since the grains cannot withstand high compressive loads. In addition, liquid propellants are less sensitive than solid propellants to performance variation, brought about by ambient temperature fluctuation. It is also well understood that high spin rates, of the type common to spin stabilized projectiles, affect the burning rate of solid propellants while not affecting liquid propellant burning. As to military applications, liquid propellants add another advantage in that they are virtually devoid of the smoke trail common to solid propellant rockets. Finally, liquid propellants display a high degree of ignition reliability due to hypergolic ignition, deliver high performance, and are relatively inexpensive.

It is, therefore, an object of the present invention to provide a rocket which is capable of being launched from a gun barrel and uses a liquid propellant having all of the aforementioned advantages.

Another object of the present invention is to provide a rocket of the above type which does not require an integral boost stage to achieve maximum performance.

A further object of the present invention is to provide a rocket of the above type which may be range controlled by a simple termination of its thrust.

Still another object of the present invention is to provide a rocket of the above type which is fin stabilized.

A still further object of the present invention is to provide a rocket of the above type which is constructed essentially of a casing containing separate oxidizer and fuel tanks together with a pressure responsive device to control the flow rate of oxidizer and fuel through an injector into a thrust chamber, the flow of propellant being instituted and terminated after a preselected time and velocity, respectively, are reached.

Further objects of the invention will in part be obvious and will in part appear hereinafter.

The invention accordingly comprises the apparatus possessing the construction, combination of elements and arrangement of parts which are exemplified in the following detailed desclosure and the scope of the application of which will be indicated in the claims.

For a fuller understanding of the nature and objects of the invention, reference should be had to the following detailed description taken in connection with the accompanying drawings wherein:

FIG. 1 is a view in elevation, and partly in cross-section of a liquid propellant rocket for use with a gun launching, embodying the present invention.

FIG. 2 is a diagrammatic representation of the rocket of FIG. 1 positioned in a gun barrel, shown in cross-section, ready to be launched.

FIG. 3 shows the rocket of FIG. 2 after it has been launched and exited from a gun barrel.

Referring to the drawings, in which like reference characters refer to like parts throughout the various figures, 10 refers generally to a rocket embodying the present invention, having a main body or casing 12, a forward payload section 14, a combustion chamber 16 having an exhaust nozzle 18. The casing 12 defines two separated chambers or tanks therein, namely a forward or oxidizer tank 20 and an aft or fuel tank 22. A flange 24 is disposed in the casing 12 to separate the tanks from each other. The aft end of the fuel tank 22 is defined by a flange 25 which mates with a bulkhead 26. Bulkhead 26 serves as the valve body and also acts as an interface between the flow of oxidizer and fuel and an injector 28 which directs the oxidizer and fuel into the combustion chamber 16.

The oxidizer tank 20 communicates with the injector 28 through a length of tubing 30 or the like connected to the bulkhead 26 by suitable means. The bulkhead 26 contains a passageway 32 which acts to complete the path between the oxidizer tank 20 and the injector 28. A valve 34 is disposed in the passageway 32 to restrict the flow of oxidizer until the rocket 10 is operated. The operation of this valve 34 will be described later. Another passageway 36, leading itno valve 38, defines a flow path between the fuel tank 22 and the injector 28. The geometry of the fluid paths just described together with that of the injector 28 determines the proper oxidizier-fuel ratio necessary to provide rocket thrust. Each passageway 32 and 36 is also provided with a shut-off capability whereby valves 34 and 38 are returned to their original closed positions when properly directed by a velocimeter (not shown) or a timer 42 if desired, either being well known conventional types. This arrangement will provide for the range zoning of the rocket, that is when the rocket is launched, if a velocimeter is used, the valves 34 and 38 will shut after a preselected velocity is reached to stop the flow of oxidizer and fuel into combustion chamber 16.

A first piston 44 is disposed in the oxidizer tank 20. Sealing contact is provided between the piston 44 and wall of tank 20 by means of sealing rings 46 of suitable material. This arrangement forms the forward end of the oxidizer tank 20. A second piston 48 is disposed in the fuel tank 22. Seal rings 50 are provided in the piston 48 for sealing contact between the tank 22 and piston 48. A piston rod 51 passing through central axial opening in the flange 24 has one of its ends secured to the aft portion of the first piston 44 and its other end secured to the forward portion of the second piston 48. Thus the pistons 44 and 48 will move together when a force is placed on the first piston 44, and will further act to displace oxidizer and fuel from the tanks into injector 28.

A gas generator 52 is associated with the first piston 44 and provides the necessary pressure to cause desired movement of the pistons 44 and 48 to displace the oxidizer and fuel, as previously indicated. The gas generator 52 includes a container 54 with a propellant charge 56 therein and an igniter 58 which in this embodiment is an electrical igniter. The igniter 58 is electrically connected to a conventional timer 60 set to operate at a preselected time after the rocket 10 is launched. The timer 42 is electrically connected to conventional type squibs (not shown) which operates valves 34 and 38. The squibs explode to open the valves 34 and 38 substantially simultaneously with the igniter of the charge 56 or a short time thereafter.

A fin stabilizer assembly 66 is positioned on the aft end of casing 12. A hollow housing 68 is secured to the aft end of the casing 12 by means of shear pins 70 or the like. The housing 68 is adapted to be jettisoned from the casing 12 when the rocket exits from a gun barrel. The aft end of the housing 68 is generally closed except for opening 69 arranged to permit gases emanating from a launching charge to enter into and fill the cavity within the housing 68. The pressure from these gases creates a pressure differential between the interior of the housing 68 and the atmosphere to cause the shear pins 70 to fracture and the housing 68 to jettison.

A plurality of fins 72 are hinged by means of pins 74 or the like to casing 12. When housing 68 is jettisoned the fins 72 are freed of restraint and pivot to the position shown in FIG. 3. A fin locking ring 75 is provided to lock the fins 72 in stabilizing orientation when the rocket 10 is in powered flight. The fins are activated to the open position by an igniter 76 which is initiated by the launch charge gases. The igniter 76 is held by a fixture 78 axially fixed to the casing 12 by shear pins 80 or the like. Discharge ports 82 are directed through the fixture 78 and casing 12 to the forward end of piston 84. Gases from the igniter urge the piston rearwardly against a portion of each fin 72 to lock each fin in place in stabilizing orientation. When the oxidizer and fuel are ignited the gases initially discharging from the exhaust nozzle 18 impinge against the fixture 78 causing the shear pins 80 to fracture and the fixture 78 to jettison.

In operation the rocket 10 is placed into a suitable gun barrrel 86 together with a launching charge 88 initiated by a standard type artillery primer (not shown). Upon initiation of the charge 88 the rocket 10 is accelerated forward. The timer 60 is activated through an inertia switch or the like. While still in the barrel 86, gases emanating from the launch charge 88 fill the housing 68 by passing through openings 69. After rocket 10 exits from the barrel 86 as shown in FIGS. 2 and 3 the pressure differential across the housing 68 causes the shear pins 70 to fracture and the housing 68 to be jettisoned. The fins 72 are opened by the action of gases from the igniter 76 on the piston 84 and then locked in their stabilizing orientation. The rocket 10 continues on trajectory in unpowered flight until the propellant charge 56 of the gas generator 52 is initiated by the timer 60. An unpowered flight interval is desirable for damping out instabilities created by the gun firing. This insures greater accuracies. The pressure in the gas generator 52 is allowed to build up for a short time and then the valve squibs (not shown) are fired opening the valves 34 and 38. The oxidizer and fuel are now free to flow into the thrust chamber 16. The pressure of the generator gases on the piston 44 causes both pistons 44 and 48 to translate rearwardly to displace oxidizer and fuel into the combustion chamber 16 through the injector 28. Typical propellants which may be used are inhibited red fumic nitric acid (IRFNA) and unsymmetrical dimethylhydrazine (UDMH). Since these are hypergolic, they flow through the injector 28, impinge in the combustion chamber 16 and then ignite. When ignition occurs, the delay igniter fixture 78 is jettisoned and propellant combustion is sustained by the gas generator 52 action and piston 44 and 48 displacement. Range zoning is achieved by velocimeter (not shown) located in the payload which senses velocity by means well known and electrically closes the valves 34 and 38 at a preselected velocity designed to give the correct range. At this point the gas from the gas generator 52 may be vented from the tank 20 through a discharge (not shown) located in gas generator tank flange assembly in order to avoid overpressurization.

It will be understood of course, that other modifications of my invention may be resorted to without departing from the spirit and scope of the claims. For example, pistonless concentric propellant tanks may be substituted for the tandem arrangement shown. In addition variations may be made by one skilled in the art in pressurization, expulsion, injection and combustion.

I claim:

1. A gun launched liquid propellant rocket comprising
 a casing,
 a payload section disposed in said casing and sealing the forward end thereof,
 a combustion chamber having an exhaust nozzle, and
 a hypergolic liquid fuel system within said casing, said system including
  a first tank for containing an oxidizer,
  a second tank for containing a fuel,
  pressure responsive means associated with said tanks for controlling the flow of oxidizer and fuel from said combustion chamber, activated by a propellant charge which initiates a first timing means at a first preselected time after launch of the rocket, and second timing means operable with said injector for closing same at a second preselected time after launch of the rocket, and
  a controllably closeable injector, interconnecting said tanks with said chamber.

2. The device of claim 1 further characterized by a stabilizer assembly on the aft end of said casing, said assembly comprising a housing fixed to said casing and adapted to be removed therefrom upon exit of the rocket from a gun, a plurality of fins mounted to said casing and movable with respect thereto, means associated with said exhaust nozzle responsive to gas pressure for locking said fins in a stabilizing orientation.

3. The device of claim 1 further characterized by said first tank containing a first piston member disposed therein, a second piston member disposed in said second tank, a piston rod having one end secured to one of said piston members, and its other end secured to the other piston member, pressure producing means communicating with said first piston member for urging both of said pistons in an aft direction to displace the oxidizer and fuel from said tanks in a preselected flow rate into said combustion chamber.

4. A liquid propellant rocket for use in a gun barrel comprising
 a casing;
 a payload section disposed in said casing and sealing the forward end thereof;
 a combustion chamber having an exhaust nozzle;
 a hypergolic liquid fuel system within said casing, said system comprising an injector communicating with said chamber adapted to direct proper proportions of hypergolic oxidizer and fuel into said chamber for ignition, a propellant valve in communication with said injector, a first tank for containing an oxidizer, a second tank for containing a fuel, both of said tanks communicating with said injector, a first piston member disposed in said first tank, a second piston disposed in said second tank, a piston rod having one end secured to one side of said piston member, and its other end secured to the other piston member, a propellant charge including means for igniting same associated with said first piston members, said propellant charge being of such quality and nature that upon ignition thereof the resulting pressure created will act to urge said pistons in an aft direction to displace oxidizer and fuel from said tanks in a preselected flow rate into said injector, timing means operable with said propellant charge for causing same to be ignited a preselected time after launch of the rocket, means operable with said valve for closing same when a preselected velocity of the rocket is reached; and a stabilizer assembly on the aft end of said casing, said assembly comprising a housing removably fixed to said casing, said housing having a closed aft end defining an opening into said housing for admitting gases emanating from said launch charge thereinto, said housing further adapted to be removed from said casing as a result of the pressure differential between the gases in said housing and the atmosphere when the rocket exists from the gun barrel, a plurality of fins mounted to said casing and movable with respect thereto upon removal of said housing, an activating piston communicating with said fins and operable by gas pressure to open said fins in a stabilizing orientation, a locking ring to lock said fins in a stabilizing orientation, a propellant charge associated with said activating piston, adapted for ignition and generation of gases for operating said piston.

References Cited
UNITED STATES PATENTS

| | | | |
|---|---|---|---|
| 2,868,127 | 1/1959 | Fox | 60—39.48 X |
| 2,884,859 | 5/1959 | Alexander et al. | 102—49.8 X |
| 2,995,008 | 8/1961 | Fox | 60—240 |
| 3,100,963 | 8/1963 | Michel | 60—240 |
| 3,196,793 | 7/1965 | Milenkovic et al. | 244—3.28 |
| 3,304,030 | 2/1967 | Weimholt et al. | 244—3.28 |

BENJAMIN A. BORCHELT, *Primary Examiner.*

V. R. PENDEGRASS, *Assistant Examiner.*